April 8, 1969
H. L. SCOTT
3,437,221
TRUCK UNLOADING APPARATUS
Filed Dec. 21, 1966
Sheet 1 of 4
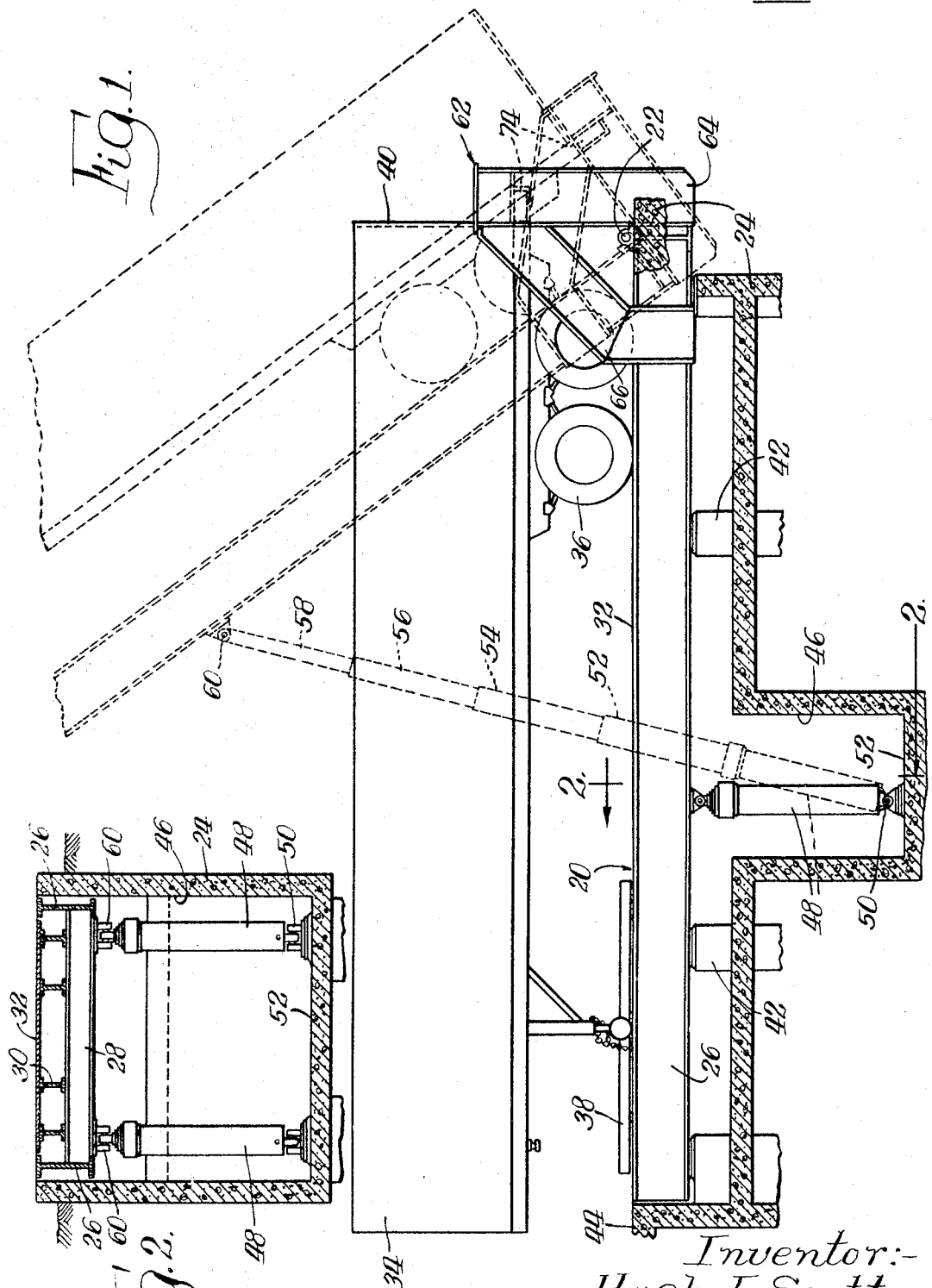
Inventor:-
Hugh L. Scott,
By Brown Jackson Boettcher + Dienner Attys.

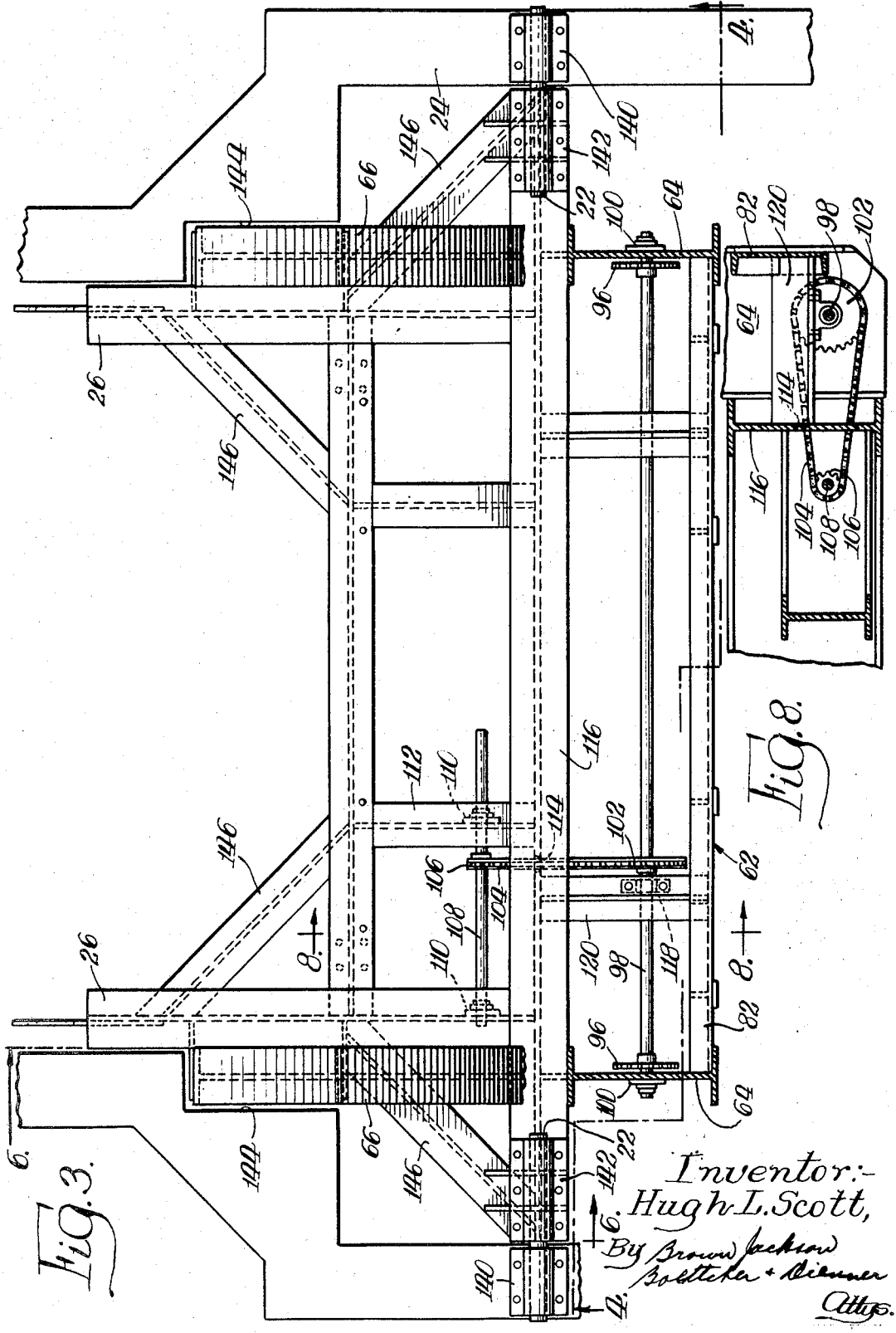

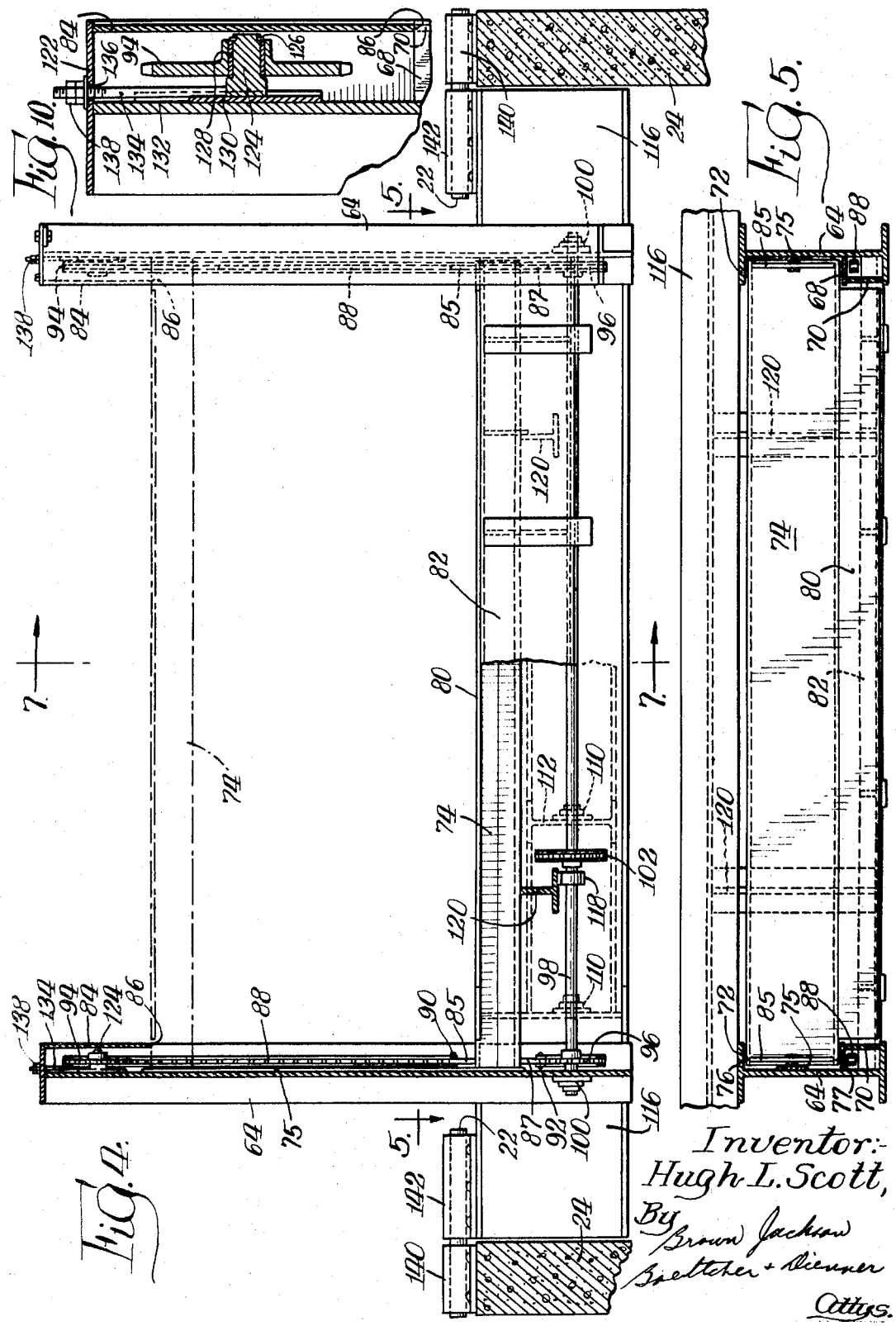

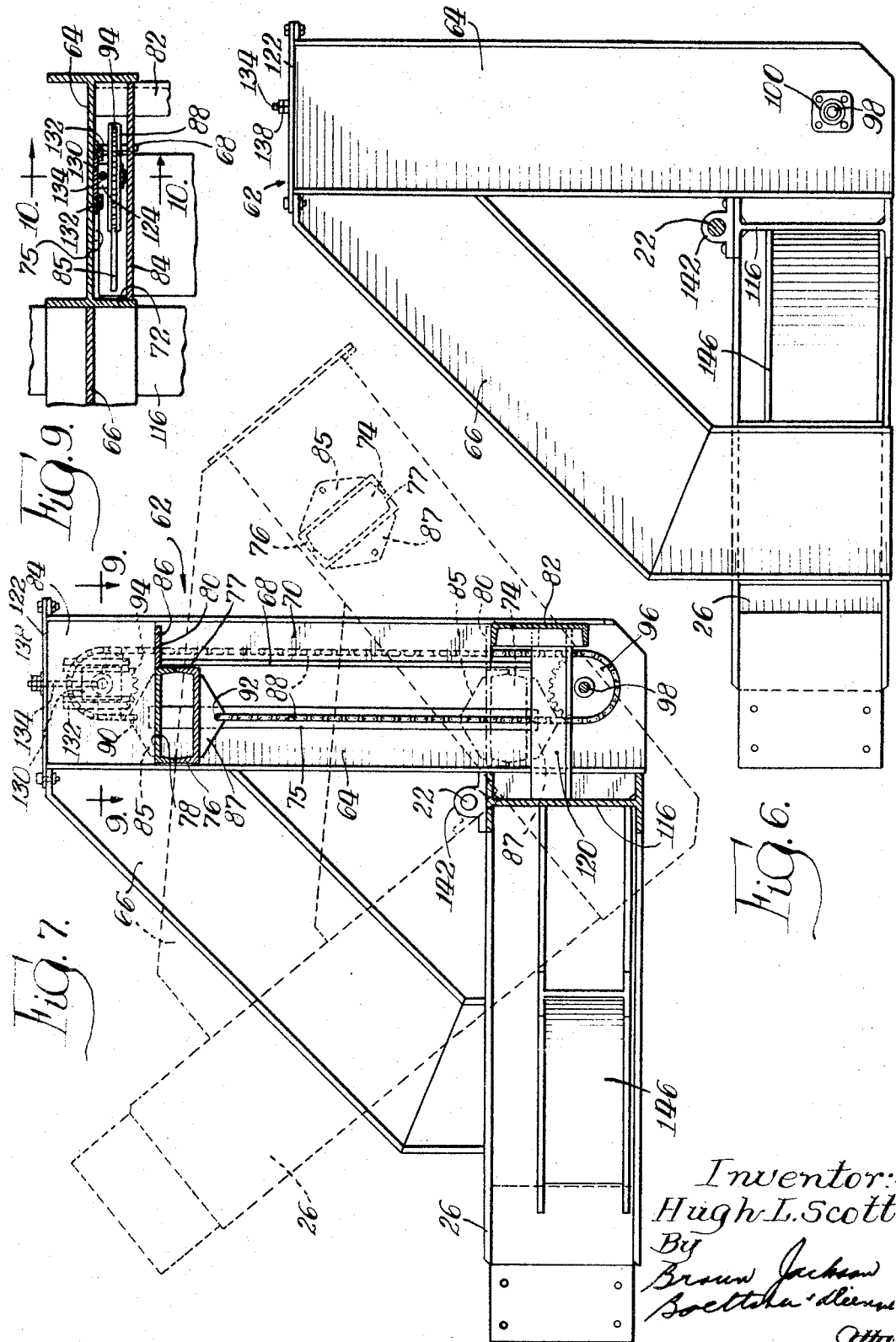

# United States Patent Office 3,437,221
Patented Apr. 8, 1969

3,437,221
TRUCK UNLOADING APPARATUS
Hugh L. Scott, Hammond, Ind., assignor to Screw Conveyor Corporation, Hammond, Ind., a corporation of Illinois
Filed Dec. 21, 1966, Ser. No. 603,480
Int. Cl. B65g 67/40
U.S. Cl. 214—49     12 Claims

ABSTRACT OF THE DISCLOSURE

A truck unloading apparatus including a tiltable truck supporting platform, a pair of parallel guide members secured to the platform on opposite sides thereof adjacent the pivotal axis in upstanding relation to the platform, a generally horizontal stop member supported for upward and downward movement by the guide members and extending substantially the width of the platform, and chain and sprocket means operatively associated with the guide members and the stop member and operative to effect selective movement of the stop member to engage the backs of different sized trucks when disposed on the platform for unloading.

---

The present invention relates generally to truck unloading apparatus, and more particularly to a truck unloading apparatus including a tiltable truck supporting platform having novel means associated therewith to engage the backs of different size trucks when disposed on the supporting platform for discharging the contents of the trucks therefrom.

Various types of apparatus have been designed and placed in use for unloading cargo carrying vehicles such as truck-trailers used to convey wood chips, metal scrap, sugarcane and other bulk material. Many of the known types of apparatus effect unloading by tilting the cargo carrying vehicle to discharge the contents therefrom into a bin or other storage area. It is desirable in the use of such unloading apparatus to provide a means to engage the back of the cargo vehicle as the vehicle is tilted to prevent rearward displacement of the vehicle during discharge of its contents.

Accordingly, it is a primary object of the present invention to provide an unloading apparatus which finds particular application in the unloading of road vehicles and which includes a tiltable vehicle supporting platform having a novel backstop means provided thereon to engage the backs of different size trucks when disposed on the platform for unloading.

Another object of the present invention is to provide a truck unloading apparatus having a novel backstop assembly disposed in an upwardly extending position adjacent the pivotal support for the platform and having a horizontal elongated stop member which may be adjusted to cooperate with the backs of different size trucks disposed on the support platform.

A further object of the present invention is to provide a truck unloading apparatus as described wherein the horizontally disposed stop member is operatively associated with chain and sprocket means for effecting movement of the stop to engage the backs of different size trucks disposed on the truck supporting platform.

Another object of the present invention is to provide a truck unloading apparatus employing a tiltable truck supporting platform having a novel backstop means which includes a horizontal stop member disposed in transverse relation to the support platform and extending substantially the width of the platform so as to engage a substantial portion of the widths of trucks disposed on the support platfrom.

Another object of the present invention is to provide a truck unloading apparatus as described including chain and sprocket means to effect raising and lowering of the stop member and having means to allow ready installation of the chain upon or removal from the sprocket members.

Still another object of the present invention is to provide a truck unloading apparatus as described employing a pair of upwardly extending support members which define guide channels to receive the ends of a horizontal stop member disposed transverse to the support platform and thereby serve to guide the stop member during raising and lowering thereof.

In a preferred embodiment of a truck unloading apparatus in accordance with the present invention, a truck supporting platform is pivotally supported adjacent one end thereof and is tiltable about its pivotal axis through a pair of hydraulically actuated piston members. The supporting platform has an upwardly extending backstop means disposed adjacent its pivotal support adapted to engage the backs of different size trucks when disposed upon the platform for emptying the cargo therefrom. The backstop means includes a generally horizontal stop member disposed in transverse relation to the support platform and guided for raising and lowering movement by a pair of upwardly extending support members. Sprocket members are rotatably supported on the upstanding support members above and below the uppermost and lowermost positions of the stop member and have chain means disposed thereon which have their end portions connected to the stop member such that rotational movement of the lower sprockets will effect raising and lowering of the stop member. A second sprocket and chain arrangement is provided to effect rotation of the lower sprocket members. The upper sprocket members are provided with means to allow ready installation of the chain onto the sprockets or removal therefrom.

Further objects and advantages of my invention, together with the organization and manner of operation thereof, may best be understood by reference to the following description, taken in conjunction with the accompanying drawings wherein like reference numerals identify like elements and in which:

FIGURE 1 is a side elevational view, taken partly in section, illustrating a truck unloading apparatus in accordance with the present invention having a cargo carrier vehicle supported thereon;

FIGURE 2 is a sectional view, taken substantially along the line 2—2 of FIGURE 1, illustrating the means for tilting the platform about its pivotal support when a truck is disposed thereon for discharging the contents of the truck from the back thereof;

FIGURE 3 is a top view of a portion of the support platform with the support deck removed and having the backstop means partially broken away to illustrate the means for raising and lowering the stop member;

FIGURE 4 is an end view, partially in section, taken substantially along the line 4—4 of FIGURE 3;

FIGURE 5 is a partial sectional view taken substantially along the line 5—5 of FIGURE 4;

FIGURE 6 is a side elevational view of the backstop means and a portion of the support platform taken substantially along the line 6—6 of FIGURE 3;

FIGURE 7 is a sectional view taken substantially along the line 7—7 of FIGURE 4;

FIGURE 8 is a fragmentary sectional view taken substantially along the line 8—8 of FIGURE 3;

FIGURE 9 is an enlarged fragmentary sectional view taken substantially along the line 9—9 of FIGURE 7; and FIGURE 10 is an enlarged sectional view taken substantially along the line 10—10 of FIGURE 9.

Referring now to the drawings, and in particular to FIGURES 1 and 2, a truck or truck-trailer unloading apparatus constructed in accordance with a preferred embodiment of the present invention comprises a supporting platform 20 pivotally supported in the vicinity of one end thereof on a pair of pivot pins 22. The pivot pins 22 are in turn suitably secured to and supported by a concrete substructure 24 which forms a foundation to receive and support the truck unloading apparatus. Referring to FIGURE 2, the supporting platform 20 is of generally rectangular cross section comprising two parallel longitudinally extending I-beams 26 suitably joined together and braced by transverse I-beams 28. A plurality of longitudinally extending I-beams 30 are supported by the transverse I-beams 28 and serve to support a deck 32 which is suitably secured to the I-beams 30 so as to provide a support surface for a cargo carrier or truck-trailer 34. It will be understood that the support platform 20 may be readily adapted to accommodate any of the conventionally known cargo carrier devices, and in particular the trailer portions of conventional truck-trailer rigs.

The truck-trailer 34 has wheels 36 which allow the truck-trailer to be backed onto the supporting deck 32 of the supporting platform 20 for purposes of discharging the cargo therefrom as will be more fully described hereinbelow. The supporting platform 20 is preferably provided with an axle hold-down means 38 (FIGURE 1) to assist in fixedly securing the truck-trailer 34 in position on the supporting platform 20. The back of the trailer truck 34 has door means 40 adapted to be opened to discharge the contents of the truck therefrom when the platform is tilted about its pivotal support 22 as will hereinafter be described.

The concrete substructure 24 includes a plurality of support pillars 42 which serve to support the platform 20 when in its horizontal position as illustrated in FIGURE 1. A runway portion 44 of the concrete substructure allows the truck or truck-trailer 34 to be readily driven onto and off the support platform 20. The concrete substructure 24 is further provided with a cavity portion 46 located generally central to the substructure which serves to receive a platform tilting means comprising two hydraulic cylinder and piston assemblies 48. Each of the cylinder and piston assemblies 48 is pivotally supported at 50 on a bottom portion 52 of the substructure cavity 46 and includes telescoping sleeve or piston portions 52, 54, 56 and 58, illustrated in their relative extended positions by dash lines in FIGURE 1. Each of the upper piston portions 58 is pivotally connected at 60 to the bottom of the support platform structure 20. The cylinder and piston assemblies 48 are suitably connected to a hydraulic control circuit (not shown) and adapted to be extended in a conventional manner for tilting the support platform 20 with the truck-trailer 34 thereon from its horizontal position to an upward inclined position as shown by dash lines in FIGURE 1. Conversely, the support platform 20 and truck-trailer 34 may be lowered from an inclined position to its horizontal position by exhausting hydraulic fluid from the cylinder and piston assemblies 48 in a conventional manner. It will be understood that the concrete substructure 24 is preferably located adjacent a hopper or storage bin (not shown) such that the contents discharged from the truck-trailer 34 will be received within the hopper or storage bin.

The truck supporting platform 20 of the unloading apparatus includes a generally upstanding backstop means, shown generally at reference numeral 62, disposed near the pivotal support 22 of the support platform. Referring to FIGURES 3 and 4, taken in conjunction with FIGURES 5–10, the backstop 62 includes a pair of support members 64 which have generally I-shaped cross sections and are suitably secured at the bottom portions thereof to the rear portion of the support platform 20. The support members 64 are disposed on opposite sides of the supporting platform 20 and extend in generally upstanding relation to the support platform, being retained in relative fixed position by support beams or struts 66. A pair of plate members 68 and 70 (FIGURE 5) are secured to the inner opposing surfaces of the support members 64 and extend upwardly through a substantial portion of the lengths of the support members. The plate members 68 combine with corresponding inner flange portions 72 and the web portions of the support members 64 to define generally upstanding guide channels which serve as a guide means to receive a horizontal elongated stop member 74.

Referring to FIGURE 4, in conjunction with FIGURES 5 and 7, the stop member 74 extends transverse to the longitudinal axis of the support platform 20 between the upstanding support members 64 and has each end thereof disposed within a guide channel in the support members. The stop member 74 is adapted for upward and downward movement relative to the support platform 20 as will be more fully described hereinbelow. The stop member 74 comprises an elongated channel member having a generally rectangular cross section (FIGURE 7) with a forward wall portion 76 thereof being adapted to engage the backs of truck-trailers or other cargo vehicles disposed upon the support platform 20. An upper plate surface 78 of stop member 74 includes a rearward projecting portion 80 having a longitudinal length which is slightly less than the distance between the plates 70 secured to the support members 64. The rearward projecting portion 80 of the stop member 74 serves to limit the downward travel or movement of the stop member 74 by engaging a transversely disposed channel member 82 which is fixedly secured to the lower portions of the support members 64. The channel member 82 is fixed to the support members 64 at a position such that when the projecting portion 80 of the stop member 74 engages the upper edge portion of the channel member 82, the upper surface 78 of the stop member will lie substantially in the plane of the upper deck 32 of the support platform 20. The upward travel of the stop member 74 in the aforedescribed guide channels of the support members 64 is limited by depending plates 84 (FIGURE 4) which are suitably secured to the opposing upper end portions of the support members and extend downwardly such that lower edge portions 86 thereof abut the upper surface 78 of the stop member 74 at the desired uppermost position of the stop member. It will be understood that the upward travel of the stop member 74 may be varied as desired, it being merely necessary to increase the height of the support members 64 to increase the upward travel, or increase the depending length of the plates 84 to reduce the upper limit of travel of the stop member. As will become apparent below, if the height of the support members 64 is increased to increase the upper limit of travel of the stop member, other elements will have to be changed accordingly. It will be further understood that when the forward surface 76 of the stop member 74 is in engaging relation with the back of the truck-trailer 34 disposed on the support platform 20, rearward movement of the stop member will be limited by engagement of the end portions of the rear surface 77 thereof against the plate members 68 secured to the support members 64. The stop member 74 has upwardly and downwardly extending plates 85 and 87, respectively, affixed to the stop member in normal relation to the longitudinal axis of the stop member slightly inwardly from the outer ends thereof. Each set of plates 85 and 87 has the ends of a chain means 88 pivotally secured thereto as at 90 and 92, respectively, which chain means 88 comprises an element of a means for raising and lowering the stop member 74 within the guide channels of the support members 64 as will be more fully described hereinbelow.

An upwardly extending plate 75 is preferably provided on each of the inner opposing surfaces of the web portions of support members 64 generally central to the guide channels defined by plates 68 and flanges 72. The plates 75 extend longitudinally along the support members 64 a distance slightly greater than the lower and uppermost limits of travel of the stop member 74 and provide plates against which the ends of the stop member may ride during upward and downward movement thereof.

Each of the chain means 88 comprises a conventional link chain disposed in driven relation about upper and lower sprockets 94 and 96 respectively, which sprockets are supported in rotatable relation on the upper and lower portions of the support members 64. Each set of sprockets 94 and 96 is disposed in coplanar relation with a corresponding set of plates 85 and 87 on the stop member 74 such that each chain means 88 may be operatively associated with the stop member and a corresponding set of sprockets. The lower sprockets 96 are fixedly secured on a shaft 98 which is rotatably supported on the lower portions of the support members 66 by conventional bearing means 100. The shaft 98 is horizontally disposed in transverse relation to the longitudinal axis of the support platform 20 and has a drive sprocket 102 fixedly secured thereon. The drive sprocket 102 is adapted to be rotatably driven by a link chain 104 which in turn is disposed about a pulley 106 in driven relation therewith. The pulley 106 is fixedly secured on a shaft 108 which is supported for driven rotation in a pair of bearing members 110. The bearing members 110 may be suitably secured, respectively, to the I-beam 26 and a crossbeam 112 such that the shaft 108 is disposed in parallel relation to the shaft 98. Any conventional means (not shown) such as a high torque electric motor may be utilized to rotatably drive the shaft 108 and thus effect rotation of shaft 98 through the drive chain 104. A suitable opening 114 must be provided in the transverse I-beam support member 116 to allow the drive chain 104 to pass therethrough without interfering with the web portion of the I-beam 116. It will be understood that, if desired, any conventional drive means may have direct connection with shaft 98. Preferably, a bearing member 118 is provided on the underside of a crossbeam 120 fixed between the I-beam 116 and the channel member 82 such that the bearing 118 may receive the shaft 98 therethrough in rotatable relation and thereby assist in supporting the shaft 98 in the area adjacent the drive sprocket 102.

The upper chain sprockets 94 are rotatably supported on the upper portions of the support members 64 in a manner to allow upward and downward movement thereof relative to the upper ends 122 of the support members 64. Referring specifically to FIGURES 9 and 10, taken in conjunction with FIGURE 7, each of the chain sprockets 94 is rotatably supported on a horizontally disposed support shaft 124 and retained thereon by a snap ring means 126. Preferably, an annular sleeve bearing 128 is disposed between the inner peripheral surface of a center mounting aperture in the sprocket 94 and the support shaft 124. Each support shaft 124 is fixedly secured to a plate 130 so as to project normally therefrom. Each plate 130 is adapted to abut the surface of the web portion of its corresponding support member 64 for sliding movement thereon and is guided by a pair of L-shaped rib members 132 secured to the web of the support member for upward and downward movement relative to the support member 64. A rod member 134 having a threaded outer end portion is secured to each of the support shafts 124 and projects through an aperture 136 provided in the upper end 122 of the corresponding support member 64. A nut means 138 is threadedly received on the outer threaded end portion of each rod 134 to allow upward and downward adjustment of the support shafts 124 and correspondingly, the chain sprockets 94. It will thus be seen that the chain sprockets 94 are supported for upward and downward movement relative to the outer ends 122 of the support members 64 and provide a means to allow ready installation of the chain means 88 upon the sprockets 94 and 96 or removal of the chain means therefrom.

As was described hereinabove, the support platform 20 is pivotally supported relative to the concrete substructure 24 through a pair of pivot pins 22. Each of the pivot pins 22 may be secured to the substructure 24 by a support bushing member 140 while the inward end of each of the pivot pins 22 pivotally supports one end of the transverse I-beam 116 through a similar support bushing 142. The concrete substructure 24 is formed with suitable recesses 144 to receive the lower ends of the support struts 66 when the support platform 20 is in its downward horizontal position. Suitable reinforcing struts 146 may be secured to the beam supporting structure forming the supporting platform 20 as are required to provide the necessary strength therefor.

Having thus described the elements comprising a prefered embodiment of a truck unloading apparatus in accordance with the present invention, its operation during the unloading or discharging of cargo from a cargo carrier disposed thereon will now be briefly described. As was above described, a cargo carrier such as a truck-trailer 34 may be backed onto the support platform 20 and secured thereto through the axle hold-down means 38. The cargo carrier is positioned on the support platform 20 in a position substantially adjacent the backstop means 62. The stop member 74 is then moved upwardly or downwardly between the support members 64 to a position wherein it cooperatively engages a back portion of the truck-trailer, for example, the main chassis support channels of the trailer disposed above the wheels 36. Upward or downward movement of the stop member 74 is effected through driving rotation of the shaft 108 in a conventional manner, such as by a high torque electric motor. Rotational movement of the shaft 108 will cause a simultaneous rotational movement of shaft 98 through the drive chain 104 and sprockets 106 and 102. Rotation of the shaft 98 will cause the chain means 88 disposed upon the sprockets 94 and 96 to be moved thereabout. The ends of the chain means 88, being pivotally connected to the plates 85 and 87 of the stop member 74 at 90 and 92 will cause the stop member 74 to be moved upwardly or downwardly within the guide channels provided in the support members 64, depending upon the direction of rotation of the shaft 108, which accordingly will be rotated in a direction dependent upon whether upward or downward movement of the stop member 74 is desired. Thus, it can be seen that the stop member 74 may be positioned as desired between the upper and lower limits of travel thereof so as to properly cooperatively engage the backs of different size trucks or cargo carriers disposed on the support platform 20. After properly positioning the stop 74 relative to the back of a vehicle on the support platform, the cylinder-piston assemblies 48 may be extended as above described through a hydraulic control circuit to tilt the support platform 20 and the truck-trailer 34 to the desired angle relative to its horizontal position for dumping or otherwise discharging the cargo from the truck-trailer. After so unloading the cargo from the truck-trailer, the support platform 20 may be lowered to its horizontal position preparatory to unloading the next cargo carrier.

While a preferred embodiment of my invention has been shown and described, it will be obvious to those skilled in the art that changes and modifications may be made therein without departing from the invention in its broader aspects.

I claim:

1. A truck unloading apparatus comprising, in combination, a truck supporting platform pivotally supported in the vicinity of one end thereof, means for tilting said platform about said pivotal support, backstop means disposed in upwardly extending relation to said platform generally adjacent said pivotal support, said backstop means including a pair of upstanding support members supported on opposite sides of said platform and a generally horizontal elongated stop member associated with said support members in transverse relation to said support platform and adapted for movement between upper and lower positions, each of said support members including means to cooperatively receive one end of said stop member for guiding relation therewith, and means operatively associated with said stop member to effect raising and lowering thereof for cooperation with the backs of different size trucks when disposed on said supporting platform.

2. A truck unloading apparatus as defined in claim 1 wherein said means operatively associated with said stop member to effect raising and lowering thereof includes chain and sprocket means.

3. A truck unloading apparatus as defined in claim 1 wherein said elongated stop member is adapted for movement in a direction normal to the plane of said supporting platform.

4. A truck unloading apparatus as defined in claim 1 wherein said upstanding support members define a generally upstanding guide channel to receive said elongated stop member in guiding relation therewith during movement between said upper and lower positions.

5. A truck unloading apparatus as defined in claim 4 wherein said pair of upstanding support members have flange portions thereon which receive the ends of said elongated stop member in guiding relation therebetween.

6. A truck unloading apparatus as defined in claim 1 wherein said means operatively associated with said stop member to effect raising and lowering thereof includes sprocket members rotatably supported above and below said upper and lower positions of said elongated stop member, and chain means disposed about said sprocket members and operatively associated with said stop member.

7. A truck unloading apparatus as defined in claim 6 including means associated with said sprocket means to allow said chain to be readily disposed about said sprocket members or removed therefrom.

8. A truck unloading apparatus as defined in claim 6 wherein the ends of said chain means are secured respectively to portions of said stop member whereby rotational movement of said sprocket members will effect raising or lowering of said stop member.

9. A truck unloading apparatus as defined in claim 6 wherein said sprocket means disposed below said lowermost position of said stop member are mounted upon a support shaft disposed in transverse relation to said supporting platform, and including means for effecting rotational movement of said support shaft.

10. A truck unloading apparatus as defined in claim 9 wherein said sprocket supporting shaft is disposed below the plane of said supporting platform.

11. A truck unloading apparatus as defined in claim 1 including means for limiting the upward and downward movement of said elongated stop member.

12. A truck unloading apparatus as defined in claim 1 including means for limiting the downward movement of said stop member such that the upper surface portion of said stop member lies in a plane coincident with the plane of said supporting platform to thereby allow trucks to be readily driven thereover.

References Cited

UNITED STATES PATENTS

| | | | |
|---|---|---|---|
| 2,603,366 | 7/1952 | Adams | 214—49 |
| 2,949,197 | 8/1960 | Lomen et al. | |
| 3,075,660 | 1/1963 | Kelley | 214—49 |
| 3,317,065 | 5/1967 | Scott | 214—49 |

ROBERT G. SHERIDAN, *Primary Examiner.*